(12) United States Patent
Seol et al.

(10) Patent No.: US 11,394,228 B2
(45) Date of Patent: Jul. 19, 2022

(54) BATTERY PACKS AND METHODS FOR CONTROLLING CHARGING OF BATTERY PACKS

(71) Applicant: Samsung SDI Co., Ltd., Yongin-si (KR)

(72) Inventors: Jihwan Seol, Yongin-si (KR); Jooyul Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/529,465

(22) Filed: Aug. 1, 2019

(65) Prior Publication Data

US 2019/0356138 A1   Nov. 21, 2019

Related U.S. Application Data

(63) Continuation of application No. PCT/KR2017/014950, filed on Dec. 18, 2017.

(30) Foreign Application Priority Data

Feb. 3, 2017  (KR) .................... 10-2017-0015693

(51) Int. Cl.
*H02J 7/00*   (2006.01)

(52) U.S. Cl.
CPC ............ *H02J 7/008* (2013.01); *H02J 7/0013* (2013.01)

(58) Field of Classification Search
CPC .......... H02J 7/008; H02J 7/0013; H02J 7/007; H02J 7/0071; H02J 7/00712;
(Continued)

(56) References Cited

U.S. PATENT DOCUMENTS

| 5,539,299 A | 7/1996 | Fernandez |
|---|---|---|
| 6,172,482 B1 | 1/2001 | Eguchi |

(Continued)

FOREIGN PATENT DOCUMENTS

| EP | 0 982 826 A2 | 3/2000 |
|---|---|---|
| JP | 2008-199717 | 8/2008 |

(Continued)

OTHER PUBLICATIONS

International Search Report and Written Opinion of the International Searching Authority dated Mar. 30, 2018 for International Patent Application No. PCT/KR2017/014950 filed Dec. 18, 2017, of which subject U.S. Appl. No. 16/529,465 is a Continuation, each of which claims priority from Korean Patent Application No. KR 10-2017-0015693 filed Feb. 3, 2017.

(Continued)

*Primary Examiner* — Richard Isla
*Assistant Examiner* — Mohammed J Sharief
(74) *Attorney, Agent, or Firm* — Knobbe, Martens, Olson & Bear, LLP (57) ABSTRACT

Battery packs and methods for controlling charging of battery packs are disclosed. In one aspect, a battery pack includes a battery including at least one battery cell, a first pack terminal and a second pack terminal configured to be connected to a charger, and a discharging switch including a first switch and a diode. The first switch is connected between the second pack terminal and the battery. The diode is connected in parallel to the first switch and has a forward direction in which charging current of the battery flows. The battery pack further includes a battery management unit configured to select a charging mode from one of a first charging mode in which the battery is charged with charging current flowing through the first switch and a second charging mode in which the battery is charged with charging (Continued)

current flowing through the diode. The battery management unit is further configured to begin charging the battery in the first charging mode and then switch the charging mode to the second charging mode.

10 Claims, 7 Drawing Sheets

(58) Field of Classification Search
CPC ............... H02J 7/00714; H02J 7/00716; H02J 7/00718; H02J 7/007182; H02J 7/007184; H02J 7/007186; H02J 7/00711; H02J 7/007188; H02J 7/00719; H02J 7/007192; H02J 7/007194
USPC .......................................................... 320/163
See application file for complete search history.

(56) References Cited

U.S. PATENT DOCUMENTS

| | | | |
|---|---|---|---|
| 8,421,417 B2 | 4/2013 | Kim et al. | |
| 2005/0156574 A1 | 7/2005 | Sato et al. | |
| 2006/0035527 A1* | 2/2006 | Numano | G06F 1/266 439/668 |
| 2007/0188134 A1* | 8/2007 | Hussain | H01M 10/44 320/114 |
| 2008/0278116 A1* | 11/2008 | Matsunaga | H03K 17/6874 320/134 |
| 2009/0295335 A1 | 12/2009 | Yang et al. | |
| 2010/0283427 A1 | 11/2010 | Sugiyama et al. | |
| 2013/0265010 A1 | 10/2013 | Nomura et al. | |
| 2014/0103876 A1* | 4/2014 | Kim | H02J 7/0014 320/112 |
| 2014/0117936 A1* | 5/2014 | Taniguchi | H02J 7/0019 320/126 |
| 2016/0016483 A1* | 1/2016 | Yasunori | B60L 1/14 320/162 |
| 2016/0126765 A1* | 5/2016 | Marini | H02J 7/00711 320/139 |
| 2017/0033582 A1* | 2/2017 | Lei | H02J 7/007184 |
| 2017/0244239 A1* | 8/2017 | Jin | H02J 7/0029 |
| 2018/0048165 A1 | 2/2018 | Shiraishi | |

FOREIGN PATENT DOCUMENTS

| | | |
|---|---|---|
| JP | 2012-227986 A | 11/2012 |
| JP | 2018-026923 A | 2/2018 |
| KR | 96-0009314 A | 3/1996 |
| KR | 10-2007-0082970 A | 8/2007 |
| KR | 10-2009-0126098 A | 12/2009 |
| KR | 10-2011-0019085 A | 2/2011 |
| KR | 10-2012-0138466 A | 12/2012 |
| KR | 10-2013-0113979 A | 10/2013 |
| KR | 10-2016-0043543 A | 4/2016 |
| WO | WO 96/013890 A1 | 5/1996 |

OTHER PUBLICATIONS

Extended European Search Report dated Oct. 14, 2020 in patent application No. 17895123.2, 8 pp.
Office Action dated Aug. 11, 2020 in Japanese patent application No. 2019-542225, 6 pp.
Office Action dated Mar. 22, 2021 in corresponding Korean patent application No. 10-2017-0015693.
Notice of allowance dated Sep. 7, 2021 in corresponding Korean patent application No. 10-2017-0015693, 2 pp.
Examination report dated Mar. 14, 2022 in corresponding European patent application No. 17895123.2, 8 pp.

* cited by examiner

BATTERY PACKS AND METHODS FOR CONTROLLING CHARGING OF BATTERY PACKS

CROSS-REFERENCE TO RELATED APPLICATIONS

This application is a continuation application and claims the benefit under 35 U.S.C. §§ 120 and 365 of PCT Application No. KR2017/014950, filed on Dec. 18, 2017, which is hereby incorporated by reference. KR2017/014950 also claimed priority to Korean Patent Application No. 10-2017-0015693 filed on Feb. 3, 2017, which is hereby incorporated by reference.

BACKGROUND

Field

The present disclosure generally relates to a battery pack and a method of controlling charging of the battery pack.

Description of the Related Technology

Due to the continuing growth in the use of portable electronic devices such as cellular phones, digital cameras, and laptop computers, there has been active development in the field of batteries for use as a power supply. Batteries used in these applications can be manufactured in the form of a battery pack together with a protective circuit for controlling the charging and discharging of the battery. Various studies have been conducted on methods and devices for efficiently charging batteries.

SUMMARY OF CERTAIN INVENTIVE ASPECTS

Battery chargers are typically configured to charge batteries to a preset full-charge voltage. The full-charge voltage can be set based on the degree of deterioration of batteries in accordance with the battery's operating voltages. However, the full-charge voltage is typically not set based on the degree of deterioration of a battery when the battery is left for an extended period of time in a fully-charged state (e.g., charged to the full-charge voltage). When a battery is left for an extended period of time in the fully-charged state, certain materials used in manufacturing the battery, such as active materials and additives may become unstable and may accelerate deterioration of the battery. Since the full-charge voltage of a battery may be determined without taking this extended period of time into consideration, the lifespan of such batteries may be rapidly shortened when left for an extended period of time in the fully-charged state.

One inventive aspect solves the above-described problem by providing a battery pack configured to be charged using a diode such that the charging of the battery pack can be completed at a voltage lower than a preset voltage compared with the voltage set by a traditional charger, thereby minimizing or reducing a decrease in the lifespan of the battery pack caused due to the battery pack being left for an extended period of time at the preset voltage. The present disclosure also provides a method of controlling the charging of the battery pack.

Another aspect is a battery pack including: a battery including at least one battery cell, a first battery terminal, and a second battery terminal; a terminal unit including a first pack terminal and a second pack terminal that are connected to a charger; a discharging switch including a first switch and a diode, the first switch being connected between the first pack terminal and the first battery terminal, the diode being connected in parallel to the first switch and having a forward direction in which charging current of the battery flows; and a battery management unit configured to determine a charging mode from one of a first charging mode in which the battery is charged with charging current flowing through the first switch and a second charging mode in which the battery is charged with charging current flowing through the diode, wherein the battery management unit starts charging the battery in the first charging mode and then switches the charging mode to the second charging mode.

According to an example of the battery pack, the battery management unit switches the charging mode from the first charging mode to the second charging mode to complete charging of the battery at a voltage which is lower than a voltage in the first charging mode by a preset voltage.

According to another embodiment of the battery pack, when a charging current of the charger for charging the battery is equal to or lower than a preset current, the battery management unit changes the charging mode from the first charging mode to the second charging mode.

According to another embodiment of the battery pack, when a charging voltage of the charger for charging the battery is maintained at a constant level, the battery management unit changes the charging mode from the first charging mode to the second charging mode.

According to another embodiment of the battery pack, when the battery is charged to a first reference voltage, the battery management unit changes the charging mode from the first charging mode to the second charging mode.

According to another embodiment of the battery pack, the battery management unit detects a state of charge of the battery, and when the detected state of charge of the battery is equal to or greater than a preset state of charge, the battery management unit changes the charging mode from the first charging mode to the second charging mode.

According to another embodiment of the battery pack, when connection of the charger is not detected between the first pack terminal and the second pack terminal in the second charging mode, the battery management unit turns on the first switch.

According to another embodiment of the battery pack, the second battery terminal is a negative terminal, and the first switch includes an N-type FET switch.

According to an aspect of the present disclosure, A method of controlling charging of a battery includes: detecting connection of a charger configured to charge the battery; charging the battery with a first charging current which flows through a first switch arranged along a high current path through which discharging current and charging current of the battery flow; turning off the first switch; and charging the battery with a second charging current which flows through a diode connected in parallel to the first switch.

According to an example of the method, the turning off of the first switch includes: sensing a charging current applied from the charger; and when the sensed charging current is less than a preset reference current, turning off the first switch.

According to another example of the method, the turning off of the first switch include: sensing a voltage of the battery; and when the sensed voltage is equal to or greater than a preset reference voltage, turning off the first switch.

According to another example of the method, when electrical connection with the charger is not detected, turning on the first switch.

Another aspect is battery pack, comprising: a battery comprising at least one battery cell, a first battery terminal, and a second battery terminal; a first pack terminal and a second pack terminal configured to be connected to a charger; a discharging switch comprising a first switch and a diode, the first switch being connected between the second pack terminal and the second battery terminal, the diode being connected in parallel to the first switch and having a forward direction in which charging current of the battery flows; and a battery management unit configured to select a charging mode from a first charging mode in which the battery is charged with charging current flowing through the first switch and a second charging mode in which the battery is charged with charging current flowing through the diode, wherein the battery management unit is further configured to begin charging the battery in the first charging mode and then switch the charging mode to the second charging mode.

According to an example of the battery pack, the battery management unit is further configured to switch the charging mode from the first charging mode to the second charging mode to complete charging of the battery at a second voltage which is lower than a first voltage in the first charging mode by a preset voltage.

According to another example of the battery pack, the battery management unit is further configured to switch the charging mode from the first charging mode to the second charging mode when a charging current of the charger for charging the battery is equal to or less than a preset current.

According to another example of the battery pack, the battery management unit is further configured to switch the charging mode from the first charging mode to the second charging mode when a charging voltage of the charger for charging the battery is maintained at a constant level.

According to another example of the battery pack, the battery management unit is further configured to switch the charging mode from the first charging mode to the second charging mode when the battery is charged to a preset reference voltage.

According to another example of the battery pack, the battery management unit is further configured to detect a state of charge of the battery, and the battery management unit is further configured to switch the charging mode from the first charging mode to the second charging mode when the detected state of charge of the battery is equal to or greater than a preset state of charge.

According to another example of the battery pack, the battery management unit is further configured to turn on the first switch when connection of the charger is not detected between the first pack terminal and the second pack terminal in the second charging mode.

According to another example of the battery pack, the second battery terminal comprises a negative terminal of the battery, and the first switch comprises an N-type FET switch.

Yet another aspect is a method of controlling charging of a battery, the method comprising: detecting connection of a charger configured to charge the battery; charging the battery with a first charging current which flows through a first switch arranged along a high current path through which discharging current and charging current of the battery flows; turning off the first switch; and charging the battery with a second charging current which flows through a diode connected in parallel to the first switch.

According to an example of the method, the turning off of the first switch comprises: sensing a charging current applied from the charger; and turning off the first switch when the sensed charging current is less than a preset reference current.

According to another example of the method, the turning off of the first switch comprises: sensing a voltage of the battery; and turning off the first switch when the sensed voltage is equal to or greater than a preset reference voltage.

According to another example of the method, the method further comprises: detecting a state of charge of the battery based on the sensed voltage; and turning off the first switch when the detected state of charge of the battery is equal to or greater than a preset state of charge.

According to another example of the method, the method further comprises: turning on the first switch when electrical connection with the charger is not detected.

Still yet another aspect is a battery pack, comprising: a battery comprising at least one battery cell; a first terminal and a second terminal configured to be connected to an external charger; a first switch and a diode connected in parallel, the first switch and the diode being electrically connected between the battery and the second terminal; and a battery management unit configured to adjust a state of the first switch such that a charging current flows through the first switch or through the diode.

According to an example of the battery pack, the battery management unit is further configured to adjust the first switch from a closed state to an open state to complete charging of the battery at a second voltage which is lower than a first voltage in the first charging mode by a preset voltage.

According to another example of the battery pack, the battery management unit is further configured to adjust the first switch from a closed state to an open state when a charging current of the charger for charging the battery is equal to or less than a preset current.

According to another example of the battery pack, the battery management unit is further configured to adjust the first switch from a closed state to an open state when a charging voltage of the charger for charging the battery is maintained at a constant level.

According to another example of the battery pack, the battery management unit is further configured to adjust the first switch from an open state to a closed state when the battery is charged to a preset reference voltage.

According to another example of the battery pack, the battery pack further comprises: a second switch and a second diode connected in parallel, wherein the second switch and the second diode are electrically connected between the first switch and the second terminal.

According to another example of the battery pack, a forward direction of the first diode is opposite to a forward direction of the second diode.

According to battery packs and methods of controlling charging of the battery packs of various embodiments of the present disclosure, a battery pack can be charged using a diode such that the charging of the battery pack can be completed at a voltage lower than a preset voltage, thereby minimizing a decrease in the lifespan of the battery pack that is caused when the battery pack is left for an extended period of time at the preset voltage.

In addition, since the battery pack can switch a charging mode of the battery from a first charging mode to a second charging mode at an appropriate time based on the state of charge and voltage of the battery, a decrease in the charging speed of the battery can be minimized or reduced, and heating in the first diode can be minimized or reduced.

DETAILED DESCRIPTION OF CERTAIN INVENTIVE ASPECTS

According to an aspect of the present disclosure, a battery pack includes: a battery including at least one battery cell, a first battery terminal, and a second battery terminal; a terminal unit including a first pack terminal and a second pack terminal that are connected to a charger; a discharging switch including a first switch and a diode, the first switch being connected between the first pack terminal and the first battery terminal, the diode being connected in parallel to the first switch and having a forward direction in which charging current of the battery flows; and a battery management unit configured to determine a charging mode from one of a first charging mode in which the battery is charged with charging current flowing through the first switch and a second charging mode in which the battery is charged with charging current flowing through the diode, wherein the battery management unit starts charging the battery in the first charging mode and then switches the charging mode to the second charging mode.

Advantages and features of the present disclosure, and implementation methods thereof will be clarified through the following descriptions given with reference to the accompanying drawings. However, the following embodiments of the present disclosure are non-limiting examples and may have different forms, and it should be understood that the idea and technical scope of the present disclosure cover all the modifications, equivalents, and replacements. Rather, these embodiments are provided so that this disclosure will be thorough and complete, and will fully convey the scope of the present disclosure to those skilled in the art. Moreover, detailed descriptions related to well-known functions or configurations will be omitted in order not to unnecessarily obscure subject matters of the present disclosure.

The terminology used herein is for explaining specific embodiments only and is not intended to limit the scope of the present disclosure. The terms of a singular form may include plural forms unless otherwise mentioned. It will be understood that terms such as "comprise," "include," and "have," when used herein, specify the presence of features, integers, steps, operations, elements, components, or combinations thereof, but do not preclude the presence or addition of one or more other features, integers, steps, operations, elements, components, or combinations thereof. It will be understood that although the terms "first" and "second" are used herein to describe various elements, these elements should not be limited by these terms. These terms are only used to distinguish one element or component from other elements or components.

Hereinafter, embodiments will be described in detail with reference to the accompanying drawings. In the drawings, identical or corresponding elements are denoted with the same reference numbers, and overlapping descriptions thereof will be omitted.

Figure 1:
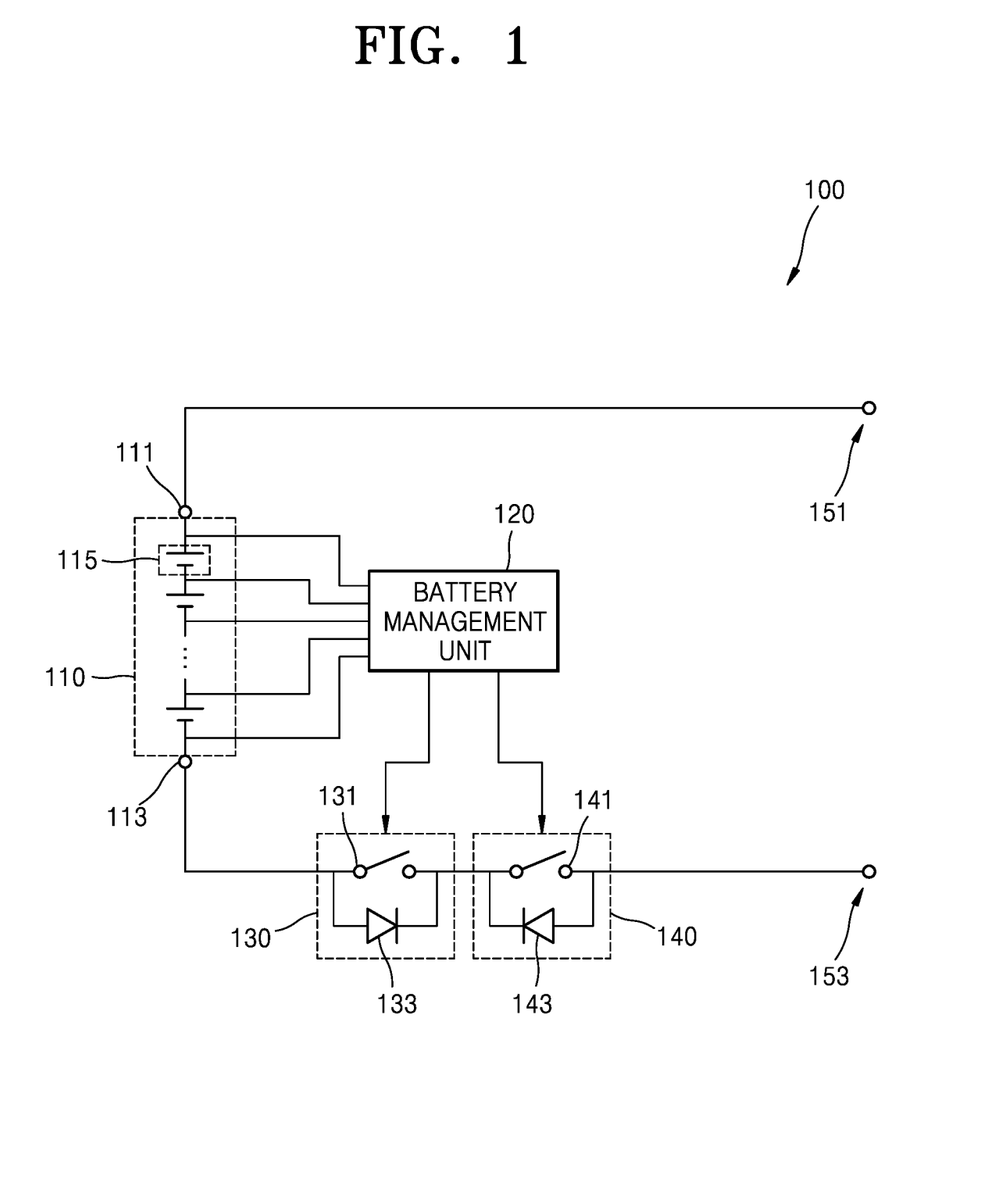
FIG. 1 is a view schematically illustrating an internal structure of a battery pack according to an embodiment of the present disclosure.

FIG. 1 is a view schematically illustrating an internal structure of a battery pack 100 according to an embodiment of the present disclosure.

Referring to FIG. 1, the battery pack 100 includes a battery 110, a first battery terminal 111, a second battery terminal 113, a battery management unit 120 (also referred to as a battery manager), a charging switch 140, a discharging switch 130, a first pack terminal 151, and a second pack terminal 153. The discharging switch 130 includes a first switch 131 and a first diode 133, and the charging switch 140 includes a second switch 141 and a second diode 143.

The battery 110 stores electricity and includes at least one battery cell 115. The battery 110 may include one battery cell 115 or a plurality of battery cells 115 which are connected in series, parallel, or series-parallel. The number of battery cells 115 included in the battery 110 and the method of connecting the battery cells 115 may be determined according to a required output voltage and a required electricity storage capacity.

The battery cells 115 may include rechargeable battery cells other than rechargeable lead-acid battery cells. For example, the battery cells 115 may include nickel-cadmium battery cells, nickel metal hydride (NiMH) battery cells, lithium-ion battery cells, or lithium polymer battery cells.

The first battery terminal 111 and the second battery terminal 113 are connected to a positive (+) electrode and a negative (−) electrode of the battery 110, respectively. The first battery terminal 111 and the second battery terminal 113 can be wiring patterns such as electrode patterns, connector patterns, terminal block patterns, land patterns, and/or pad patterns. In addition, the second battery terminal 113 can be connected to one of the negative and positive electrodes of the battery 110, and the present disclosure is not limited to the specific implementation shown in FIG. 1 in which the second battery terminal 113 is connected to the negative electrode of the battery 110. For example, when the second battery terminal 113 is connected to the negative electrode of the battery 110, the first battery terminal 111 is connected to the positive electrode of the battery 110, and when the second battery terminal 113 is connected to the positive electrode of the battery 110, the first battery terminal 111 is connected to the negative electrode of the battery 110.

The first pack terminal 151 and the second pack terminal 153 may be electrically connected to an external device (not shown). The first pack terminal 151 and the second pack terminal 153 may be wiring patterns such as electrode patterns, connector patterns, terminal block patterns, land patterns, and/or pad patterns. The first pack terminal 151 is electrically connected to the first battery terminal 111, and the second pack terminal 153 is electrically connected to the second battery terminal 113. Therefore, when the first battery terminal 111 is connected to the positive (+) electrode of the battery 110, the first pack terminal 151 is a positive pack terminal. Similarly, since the second battery terminal 113 is connected to the negative electrode of the battery 110, the second pack terminal 153 is a negative pack terminal.

The battery pack 100 can be connected to an external device through the first pack terminal 151 and the second pack terminal 153. Examples of the external device include a load which consumes electricity received from the battery 110, and a charger 10 (e.g., refer to FIG. 4) which charges the battery 110 by supplying electricity to the battery 110.

The discharging switch 130 is arranged between the second battery terminal 113 and the second pack terminal 153. The discharging switch 130 is placed along a high current path through which charging current and discharging current of the battery 110 flow, and the discharging switch 130 may allow or interrupt the flow of discharging current of the battery 110. The first diode 133 may have a forward direction in which charging current of the battery 110 flows, and a direction in which discharging current of the battery 110 flows may be the reverse direction of the first diode 133 such that the first diode 133 may interrupt the flow of discharging current. The first switch 131 and the first diode 133 can be implemented using a power MOSFET device having a vertical diffused MOS (VDMOS) structure.

The charging switch 140 is arranged between the discharging switch 130 and the second pack terminal 153. Like the discharging switch 130, the charging switch 140 can be placed along the high current path and can allow or interrupt the flow of charging current. The charging switch 140 includes a second switch 141 and a second diode 143, wherein the second diode 143 may have a forward direction in which discharging current flows, and a direction in which charging current flows may be the reverse direction of the second diode 143 such that the second diode 143 may interrupt the flow of charging current. The second switch 141 and the second diode 143 may be implemented using a power MOSFET device having a vertical diffused MOS structure.

The battery management unit 120 may sense the current, voltage, or temperature of the battery 110, and may obtain information such as the remaining electricity, lifespan, and state of charge (SOC) of the battery 110 based on the sensed information. For example, the battery management unit 120 may measure the voltage and temperature of the battery cells 115 using sensors. In addition, the battery management unit 120 can monitor the voltage between the first pack terminal 151 and the second pack terminal 153 to detect whether the charger 10 is connected.

The battery management unit 120 can turn off at least one of the charging switch 140 and the discharging switch 130 when the battery 110 is likely to be exposed to danger. The battery management unit 120 may control the charging switch 140 and the discharging switch 130 to protect the battery 110 when the battery 110 is overdischarged, overcharged and/or there is a possibility of overcurrent, overvoltage, and/or overheating.

When it is detected that the voltage of the battery 110 is equal to or less than a certain value, the battery management unit 120 can turn off the first switch 131 of the discharging switch 130 to prevent overdischarging of the battery 110. When the first switch 131 is turned off, the battery 110 is not discharged, but charging current may flow to the battery 110 through the first diode 133.

Similarly, the battery management unit 120 can turn off the second switch 141 of the charging switch 140 to prevent the battery 110 from being overcharged. When the second switch 141 is turned off, the battery 110 is not charged, but discharging current may flow through the second diode 143.

In addition, the battery management unit 120 may open both the first switch 131 and the second switch 141 to interrupt both charging current and discharging current when the battery 110 is exposed to danger due to overheating and/or overcurrent.

According to an embodiment, the battery management unit 120 can determine one of a first charging mode and a second charging mode to be used as the charging mode of the battery 110. The first charging mode can be a mode for charging the battery 110 in a state in which the first switch 131 is turned on to allow charging current to flow to the battery 110 through the first switch 131. The second charging mode can be a mode for charging the battery 110 in a state in which the first switch 131 is turned off such that charging current flows via the first diode 133.

When the charger 10 is connected between the first pack terminal 151 and the second pack terminal 153, the battery 110 can be charged in the first charging mode up to a voltage corresponding to a voltage applied between the first pack terminal 151 and the second pack terminal 153. In the second charging mode, the battery 110 can be charged up to a target voltage that is lower than the voltage applied between the first pack terminal 151 and the second pack terminal 153 by a preset voltage. The preset voltage can be a voltage reduced by the first diode 133 according to the characteristics of the first diode 133. Details of the preset voltage will be described below with reference to FIG. 2.

Figure 2:
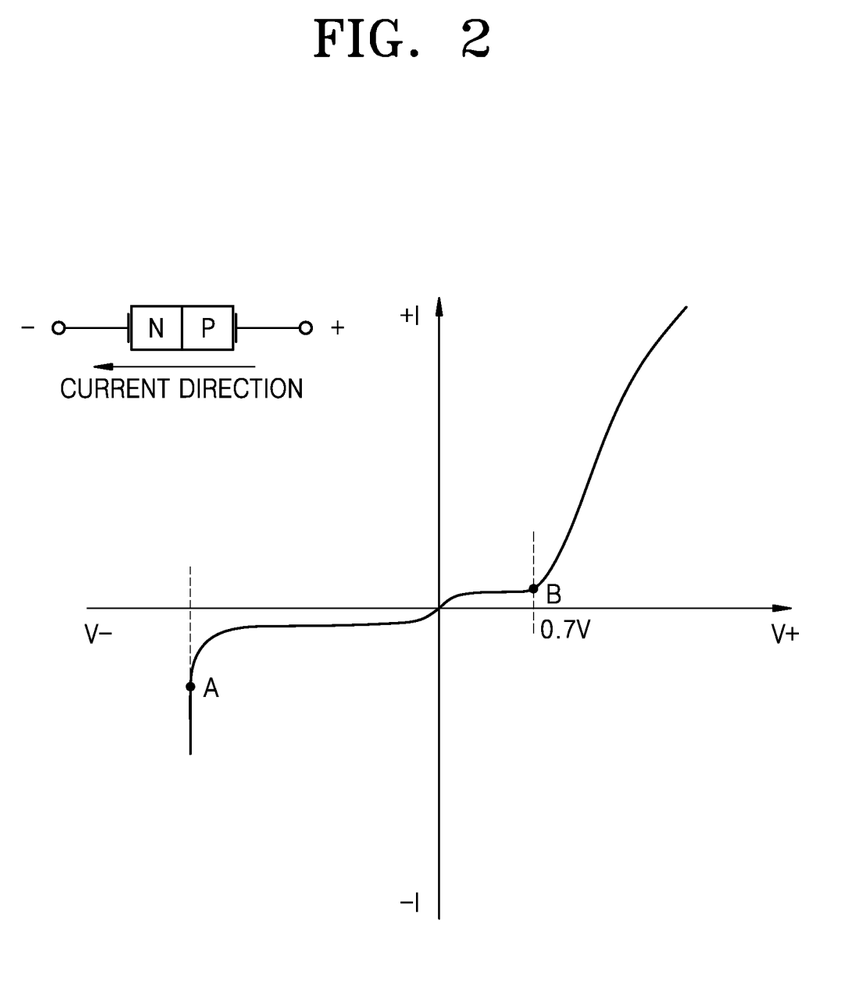
FIG. 2 is a view schematically illustrating the structure and characteristic curve of a diode.

FIG. 2 is a view schematically illustrating the structure and characteristic curve of a diode.

Referring to FIG. 2, the diode can be formed by bonding a P-type semiconductor to an N-type semiconductor. The diode can allow current to flow in a direction from the P-type semiconductor to the N-type semiconductor, but can prevent current from flowing in the opposite direction.

In the diode, the number of free electrons and the number of holes can decrease at a junction interface, thereby forming an insulating region. Specifically, the density difference between free electrons and holes at the junction interface causes the free electrons to diffuse to the P-type semiconductor and holes to diffuse to the N-type semiconductor, thereby forming a depletion layer by recombination of the free electrons and the holes. The diode can have an electric field formed in the depletion layer, and the electric field can prevent the depletion layer from expanding further. As a result, in the diode, the electric field can cause a potential difference between both ends of the depletion layer, which is called a diffusion voltage Vb. The diffusion voltage Vb can be about 0.3 V in a germanium semiconductor and about 0.7 V in a silicon semiconductor.

Referring to the graph shown in FIG. 2, when a forward voltage is applied to the diode, for example, when a positive (+) power source terminal is connected to the P-type semiconductor and a negative (−) power source terminal is connected to the N-type semiconductor, free electrons and holes of the depletion layer can migrate to original positions in the diode. When the forward voltage is equal to or higher than the diffusion voltage Vb, electrons and holes may freely move through the depletion layer, and thus current can be allowed to flow. In this case, a voltage drop occurs between both ends of the diode in an amount equal to the diffusion voltage Vb. The diffusion voltage Vb can be the preset voltage described with reference to FIG. 1. The preset voltage can be maintained at a constant level regardless of the magnitude of current flowing through the diode. For example, when the diffusion voltage Vb of the diode is 0.7 V, the diffusion voltage can be maintained at 0.7 V regardless of whether the current flowing through the diode is 1 A or 2 A. That is, when a forward voltage is applied to the diode, a constant voltage drop of 0.7 V can occur between both ends of the diode regardless of the magnitude of current.

In contrast, when a reverse voltage is applied to the diode, for example, when a negative (−) power source terminal is connected to the P-type semiconductor and a positive (+) power source terminal is connected to the N-type semiconductor, the depletion layer can become larger and free electrons and holes are collected at both ends of the diode. In this case, the free electrons and holes are prevented from moving through the depletion layer in the diode, and thus current does not flow. In addition, when a voltage equal to or greater than a breakdown voltage Va is applied across both ends of the diode, the diode is broken, and reverse current flows.

According to an embodiment, in the second charging mode, the battery 110 can be charged up to the target voltage that is lower than a voltage applied between the first pack terminal 151 and the second pack terminal 153 by the preset voltage. In the second charging mode, the battery 110 can be charged with a charging current that flows through the first diode 133 and the second switch 141. The battery 110 can be supplied with a voltage which is lowered by the preset voltage at the first diode 133. Meanwhile, the magnitude of diffusion voltage remains unchanged within a certain range of current flowing through the first diode 133. For example, when the charger 10 charges the battery pack 100 at a constant voltage of 29.4 V, the battery 110 is charged up to 28.7 V which is lowered from 29.4 V by 0.7 V. That is, the battery 110 is charged to a voltage which is lower than the voltage applied by the charger 10 by the voltage drop at the diode.

In contrast, in the first charging mode, the battery 110 can be charged up to a voltage corresponding to the voltage applied by the charger 10. In the first charging mode, a charging current flows through the first switch 131 and the second switch 141. The voltage drop at the first switch 131 and the second switch 141 is negligibly small, and thus the battery 110 can be charged up to a voltage corresponding to the voltage applied by the charger 10. For example, when the charger 10 charges the battery pack 100 at a constant voltage of 29.4 V, the battery 110 may be charged up to 29.4 V.

Meanwhile, as the charging by the charger 10 proceeds, the magnitude of charging current flowing through the battery 110 decreases, and thus, when the charger 10 detects a current less than a preset current, the charger 10 determines that the battery 110 is completely charged. Hereinafter, for each of illustration, the situation in which the charger 10 detects that the battery 110 is completely charged will be described as a state in which the battery 110 is fully charged.

Figure 3:
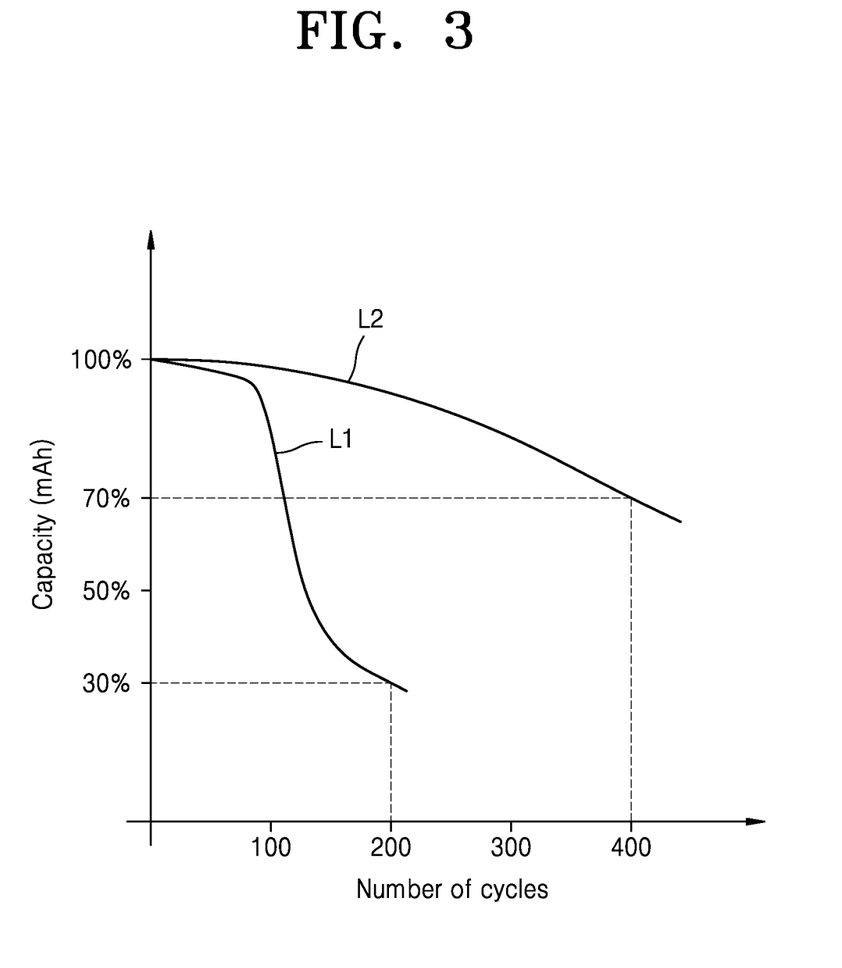
FIG. 3 is a graph illustrating the degree of deterioration of a battery according to the number of times that the battery is fully charged and left for an extended period of time.

FIG. 3 is a graph illustrating the degree of deterioration of the battery 110 according to the number of times that the battery 110 is fully charged and left for a certain period of time at the fully charged state.

Referring to FIG. 3, the vertical axis refers to the capacity of the battery 110, and the horizontal axis refers to the number of times that the battery 110 is charged.

The charger 10 charges the battery 110 in a constant-current charging mode in which a constant charging current is applied to the battery pack 100 and in a constant-voltage charging mode in which a constant charging voltage is applied to the battery pack 100. The charger 10 starts to charge the battery 110 in the constant-current charging mode, and when it is determined that the battery 110 reaches a certain voltage or a certain state of charge (SOC), the charger 10 changes the charging mode from the constant-current charging mode to the constant-voltage charging mode. Meanwhile, the charger 10 may apply various square-wave charging currents to the battery pack 100, and the application of square-wave charging currents can also be included in the constant-current charging mode. The present disclosure is not limited to the use of a constant-current charging scheme.

The charger 10 is configured to charge the battery 110 up to a full-charge voltage at which the lifespan of the battery 110 is not shortened and the battery 110 is not damaged. To this end, the charger 10 applies the full-charge voltage to the battery pack 100 in the constant-voltage charging mode. For example, when seven battery cells 115 connected in series are charged, if the voltage for safely charging each of the battery cells 115 is 4.2 V, the full-charge voltage is set to be 29.4 V.

However, the battery 110 may be left unused for a certain period of time after being charged up to the full-charge voltage. For example, the battery pack 100 may be included in an electric bicycle or an electric vehicle. The battery pack 100 included in an electric bicycle or an electric vehicle may be left for an extended period of time in a fully-charged state, for example, when the user of the electric bicycle or vehicle is asleep. When the battery 110 is left for an extended period of time in the fully-charged state on a regular basis (e.g., every day), and certain materials of the battery such as active materials and additives included in the battery cells 115 of the battery 110 are left for the extended periods of time in an unstable state, thereby accelerating deterioration of the battery 110. This can be clearly understood from a first curve L1 and a second curve L2 shown in FIG. 3.

That is, in some configurations, the full-charge voltage of the charger 10 can be set by considering only the degree of deterioration of the battery 110 according to a charging voltage without considering a decrease in the lifespan of the battery 110 when the battery 110 is left in a fully-charged state for a certain period of time.

The first curve L1 and the second curve L2 show the degree of decrease in the lifespan of the battery 110 for the cases in which the battery cells 115 are used after being left for a certain period of time at different voltages. The first curve L1 shows the degree of decrease in the lifespan of the battery 110 when the battery 110 is charged up to the full-charge voltage set in the charger 10 of the related technology and is then left for a certain period of time, and the second curve L2 shows the degree of decrease in the lifespan of the battery 110 when the battery 110 is charged up to a voltage (hereinafter referred to as a target voltage) which is lower than the full-charge voltage of the charger 10 of the related technology by the preset voltage described with reference to FIG. 2 and is then left for the certain period of time. As described above, the preset voltage refers to the voltage drop at the first diode 133, and the target voltage is a voltage obtained by subtracting the preset voltage from the full-charge voltage. In addition, the certain period of time is a time period during which the battery 110 is left in a state in which the battery 110 is connected to the charger 10 of the related technology after being completely charged by the charger 10, and the certain period of time may be 4 hours or longer.

When the battery 110 is left for the certain period time in a state in which the battery 110 is completely charged and connected to the charger 10, the degree of deterioration of the battery 110 and the degree of decrease in the lifespan of the battery 110 are referred to as a combine cycle life. That is, the first curve L1 shows the combine cycle life of the battery 110 when the battery 110 is charged to the full-charge voltage set in the charger 10, and the second curve L2 shows the combine cycle life of the battery 110 when the battery 110 is charged to the target voltage.

For example, when the battery cells 115 reach 4.2 V after being charged up to the full-charge voltage set in the charger 10, the first curve L1 indicates the combine cycle life of the battery cells 115 in a state in which the battery cells 115 are completely charged to 4.2 V, and the second curve L2 indicates the combine cycle of the battery cells 115 in a state in which the battery cells 115 are completely charged to 4.1 V.

When the first curve L1 and the second curve L2 are compared with each other, the deterioration of the battery 110 occurs relatively slowly when the battery 110 is charged to a voltage lower than the full-charge voltage set in the charger 10 of the related technology. Considering this, it may be necessary to readjust the full-charge voltage set in the charger 10 of the related technology to increase the lifespan of the battery 110. However, this reconfiguration of the charger is not easy because of the costs associated with redesigning or replacing the charger 10. According to embodiments of the present disclosure, although the battery pack 100 is connected to the charger 10 of the related technology, charging of the battery 110 can be completed at a voltage lower than the full-charge voltage set in the charger 10 by using the first diode 133 and the first switch 131 included in the discharging switch 130, and thus it can be possible to improve the lifespan of the battery 110 including the combine cycle life of the battery 110.

According to embodiments of the present disclosure, in the second charging mode, the battery pack 100 can be charged to the target voltage which is lower than the full-charge voltage set in the charger 10 by using the first diode 133 and the first switch 131 included in the discharging switch 130. As described with reference to FIG. 2, in the second charging mode, the battery pack 100 can turn off the first switch 131 to cause a charging current to flow through the first diode 133 such that a voltage lower than the full-charge voltage applied by the charger 10 of the related technology may be applied to the battery 110. In this case, the battery 110 has a combine cycle life according to the second curve L2, not the first curve L1. That is, it is possible to reduce a decrease in the lifespan of the battery 110 by completing charging of the battery 110 in the second charging mode instead of completing charging of the battery 110 in the first charging mode.

In other words, even when the full-charge voltage of the charger 10 of the related technology is set without considering the combine cycle life of the battery 110, the battery pack 100 can charge the battery 110 only up to the target voltage which is lower than the full-charge voltage of the charger 10 by using the first diode 133, and thus rapid deterioration of the battery 110 occurring when the battery 110 is left for an extended period of time after being fully charged can be prevented.

For example, when the charger 10 of the related technology is designed to charge the battery 110 including seven battery cells 115 to a voltage of 29.4 V, the battery 110 is charged to 29.4 V in the first charging mode and thus each of the battery cells 115 is charged to 4.2 V. In the second charging mode, the battery 110 is charged up to the target voltage which is lowered by the first diode 133, and when the voltage drop at the first diode 133 is 0.7 V, the battery 110 is charged up to 28.7 V and thus each of the battery cells 115 is charged up to 4.1 V. Thus, when charging of the battery 110 is completed in the second charging mode, the lifespan of the battery 110 decreases less according to the second curve L2 than in the case in which the lifespan of the battery 110 decreases according to the first curve L1 as a result of charging in the first charging mode.

Thus, according to embodiments of the present disclosure, the battery pack 100 can lower the full-charge voltage at which charging of the battery 110 is completed by using the first diode 133 without replacing the charger 10 of the related technology, and thus the lifespan of the battery 110 can be increased.

Figure 4:
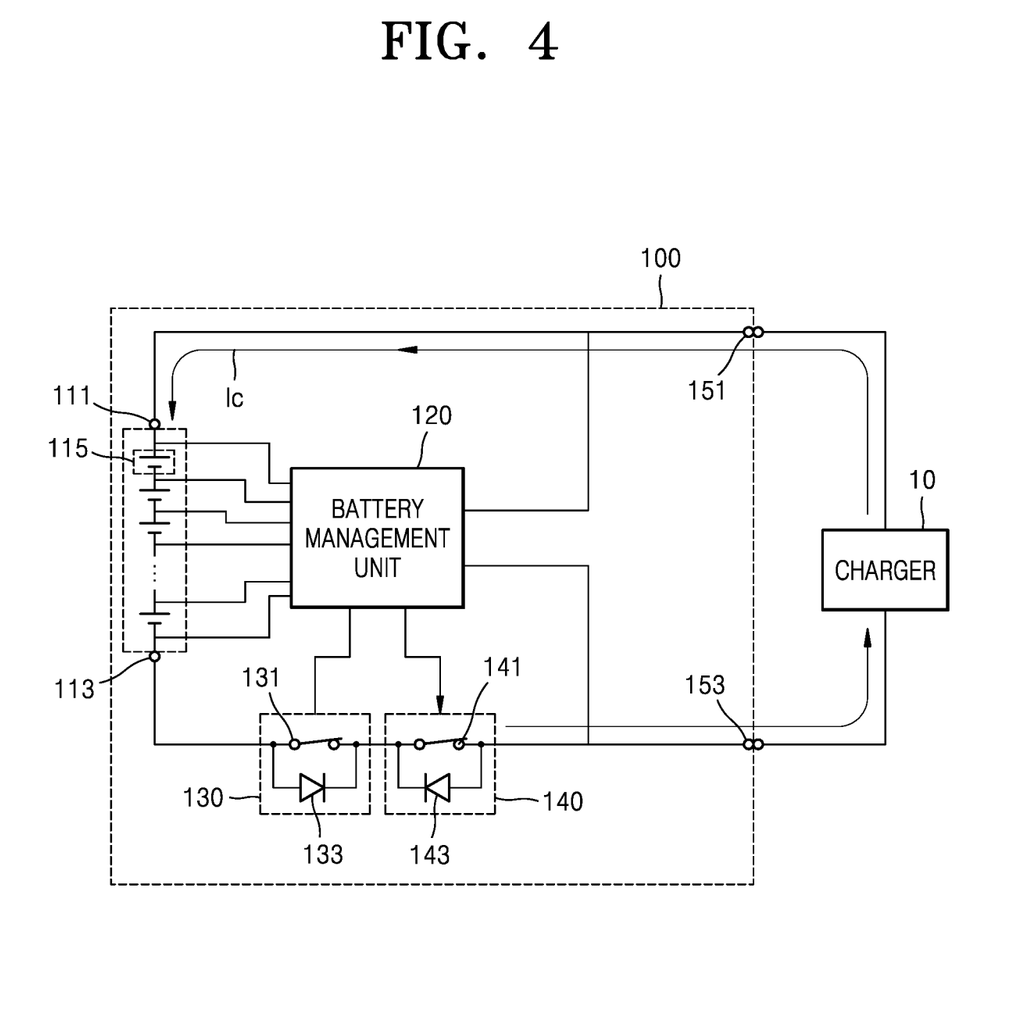
FIG. 4 is a view illustrating the flow of charging current in a first charge mode according to an embodiment of the present disclosure.
Figure 5:
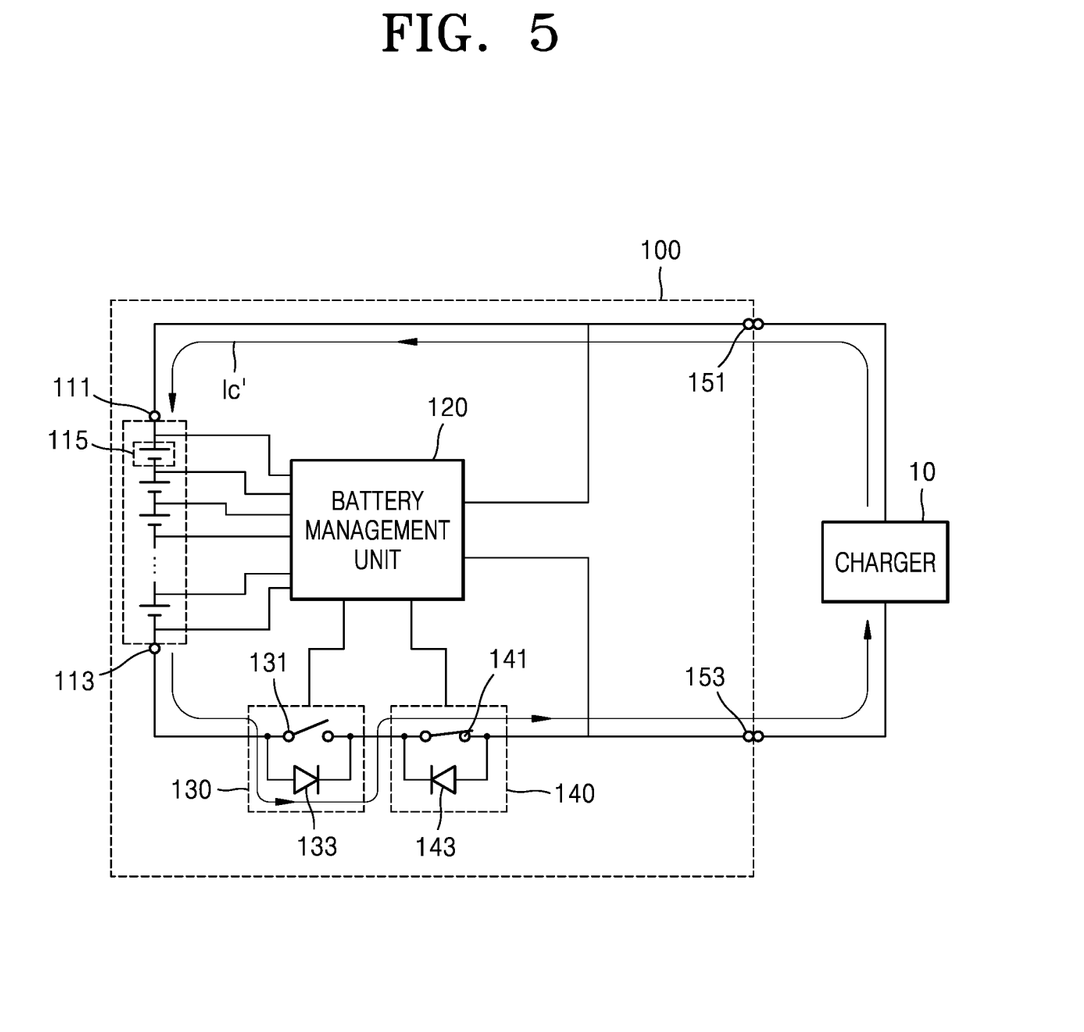
FIG. 5 is a view illustrating the flow of charging current in a second charge mode according to an embodiment of the present disclosure.

FIG. 4 is a view illustrating the flow of charging current in the battery pack 100 in the first charging mode according to an embodiment of the present disclosure, and FIG. 5 is a view illustrating the flow of charging current in the battery pack 100 in the second charging mode according to an embodiment of the present disclosure.

Referring to FIG. 4, in the first charging mode, a charging current Ic flows through the first pack terminal 151, the battery 110, the first switch 131, the second switch 141, and the second pack terminal 153.

Since voltage drops at the first switch 131, the second switch 141, and a wire are negligibly small, a voltage sensed across the first pack terminal 151 and the second pack terminal 153 corresponds to a voltage sensed across the first battery terminal 111 and the second battery terminal 113. For example, when a voltage applied between the first pack terminal 151 and the second pack terminal 153 is 29 V, a voltage between the first battery terminal 111 and the second battery terminal 113 is also 29 V.

In this case, the battery 110 is charged to the full-charge voltage described with reference to FIG. 3. That is, since the voltage between the first battery terminal 111 and the second battery terminal 113 corresponds to the voltage between the first pack terminal 151 and the second pack terminal 153, the battery 110 is charged to a voltage corresponding to the full-charge voltage applied by the charger 10.

Referring to FIG. 5, since the first switch 131 is turned off in the second charging mode, a charging current Ic' flows through the first pack terminal 151, the battery 110, the first diode 133, the second switch 141, and the second pack terminal 153.

When the charging current Ic' flows in the forward direction of the first diode 133, a voltage drop occurs corresponding to a diffusion voltage of the first diode 133 according to the internal characteristics of the first diode 133. For example, when the first diode 133 includes silicon, the diffusion voltage is 0.7 V, and the voltage between the first battery terminal 111 and the second battery terminal 113 is lower than the voltage between the first pack terminal 151 and the second pack terminal 153 by 0.7 V. In addition, the diffusion voltage remains unchanged although the magnitude of current flowing through the first diode 133 varies.

According to an embodiment, the first switch 131 and the first diode 133 are located between the second pack terminal 153 and the second battery terminal 113 which is a negative (−) terminal of the battery 110. In this case, the first switch 131 includes an N-channel MOSFET. The N-channel MOSFET may be fabricated at lower costs than a P-channel MOSFET, and it is also possible to remove the possibility of counter electromotive force occurring when the first switch 131 and the first diode 133 are arranged between the first pack terminal 151 and the first battery terminal 111 which is the positive a positive (+) terminal of the battery 110.

According to an embodiment, in the second charging mode, the battery 110 is fully charged to the target voltage which is lower than the full-charge voltage by the voltage drop at the first diode 133. In this case, when the battery 110 is charged close to the target voltage, the charging current flowing in the battery 110 becomes lower than the preset current, and the charger 10 may determine that the battery 110 is fully charged.

According to an embodiment, the battery management unit 120 may start charging of the battery 110 in the first charging mode and may switch the mode of charging to the second charging mode when a preset condition is satisfied during charging of the battery 110. When the battery 110 is continuously charged in the second charging mode, the voltage drop at the first diode 133 may cause a decrease in the charging speed of the battery 110 and heating in the first diode 133. To minimize a decrease in the charging speed of the battery 110 and heating in the first diode 133, the battery management unit 120 may switch the charging mode of the battery 110 from the first charging mode to the second charging mode when the voltage or charging current of the battery 110 satisfies a preset condition.

The preset condition may be set by considering the time and characteristics when the charger 10 switches from a constant-current charging mode to a constant-voltage charging mode. For example, the charger 10 may switch from the constant-current charging mode to the constant-voltage charging mode when the voltage of the battery cells 115 of the battery 110 is within the range of 4 V to 4.05 V, or the state of charge (SOC) of the battery 110 is within the range of 80% to 90%. In this case, the battery management unit 120 may determine that the preset condition is satisfied when the voltage of the battery 110 reaches a value ranging from 4 V to 4.05 V or the state of charge (SOC) of the battery 110 reaches a value ranging from 80% to 90%.

In addition, since the charger 10 applies a constant voltage to the battery pack 100 in the constant-voltage charging mode, when the battery management unit 120 detects application of a constant voltage, the battery management unit 120 may determine that the preset condition is satisfied.

Furthermore, since charging current output from the charger 10 gradually decreases while the charger 10 switches from the constant-current charging mode to the constant-voltage charging mode, the battery management unit 120 may switch from the first charging mode to the second charging mode when the battery management unit 120 detects that the charging current output from the charger 10 gradually decreases from a constant value.

In addition, the battery management unit 120 may determine that the preset condition is satisfied when it is determined, based on variations in the voltage and charging current of the battery 110, that the battery 110 will soon reach the target voltage.

According to an embodiment, the battery management unit 120 may switch the charging mode of the battery 110 from the first charging mode to the second charging mode based on the voltage of the battery cells 115. The battery management unit 120 measures the voltage of at least one of the battery cells 115 and determines whether the battery 110 reaches a preset reference voltage based on the voltage of the at least one battery cell 115 and the number of battery cells 115 included in the battery 110. For example, when the voltage of one of the battery cells 115 is 4.05 V and the battery 110 includes seven battery cells 115, the battery management unit 120 may detects 28.35 V as the voltage of the battery 110 and may determine whether the voltage of the battery 110 is equal to or greater than the preset reference voltage.

Meanwhile, the preset reference voltage may be set with reference to the characteristics of the first diode 133 and the full-charge voltage of the charger 10. For example, when the voltage drop at the first diode 133 is 0.7 V and the full-charge voltage of the charger 10 is 29 V, the preset reference voltage may be set to be between 26 V and 28 V. In this case, the battery management unit 120 may change the charging mode of the battery 110 from the first charging mode to the second charging mode before the battery 110 reaches the target voltage of 28.3 V.

According to an embodiment, the battery management unit 120 may switch from the first charging mode to the second charging mode when a current lower than a preset reference current is sensed. The preset reference current may be set by considering the difference between the target voltage and the full-charge voltage. As the battery 110 is charged, the difference between the voltage between the first battery terminal 111 and the second battery terminal 113 and the voltage between the first pack terminal 151 and the second pack terminal 153 applied by the charger 10 is reduced, and thus charging current output from the charger 10 is also gradually reduced such that the battery management unit 120 may sense, based on the variation in the charging current, that the battery 110 will soon reach the target voltage. For example, when the full-charge voltage is 20 V, the target voltage is 19V, and the charging current is 500 mA when the voltage of the battery 110 is near 19 V, the preset reference current may be set to be between 500 mA and 700 mA.

In this case, the battery pack 100 may charge the battery 110 to the target voltage which is lower than the full-charge voltage without affecting the constant-current, constant-voltage charging by the charger 10. That is, the battery management unit 120 only charges the battery 110 with a voltage lower than a voltage applied by the charger 10 in a state in which the first switch 131 is turned off and a voltage drop occurs at the first diode 133. Therefore, since the connection between the battery 110 and the charger 10 is not forcibly interrupted, the charger 10 may still charge the battery 110 with a constant voltage even though the first switch 131 is turned off.

In an embodiment, the battery management unit 120 may turn on the first switch 131 when the charger 10 is not connected between the first pack terminal 151 and the second pack terminal 153. When the charger 10 is not connected between the first pack terminal 151 and the second pack terminal 153, the battery management unit 120 may turn on the first switch 131 to allow discharging of the battery 110.

Figure 6:
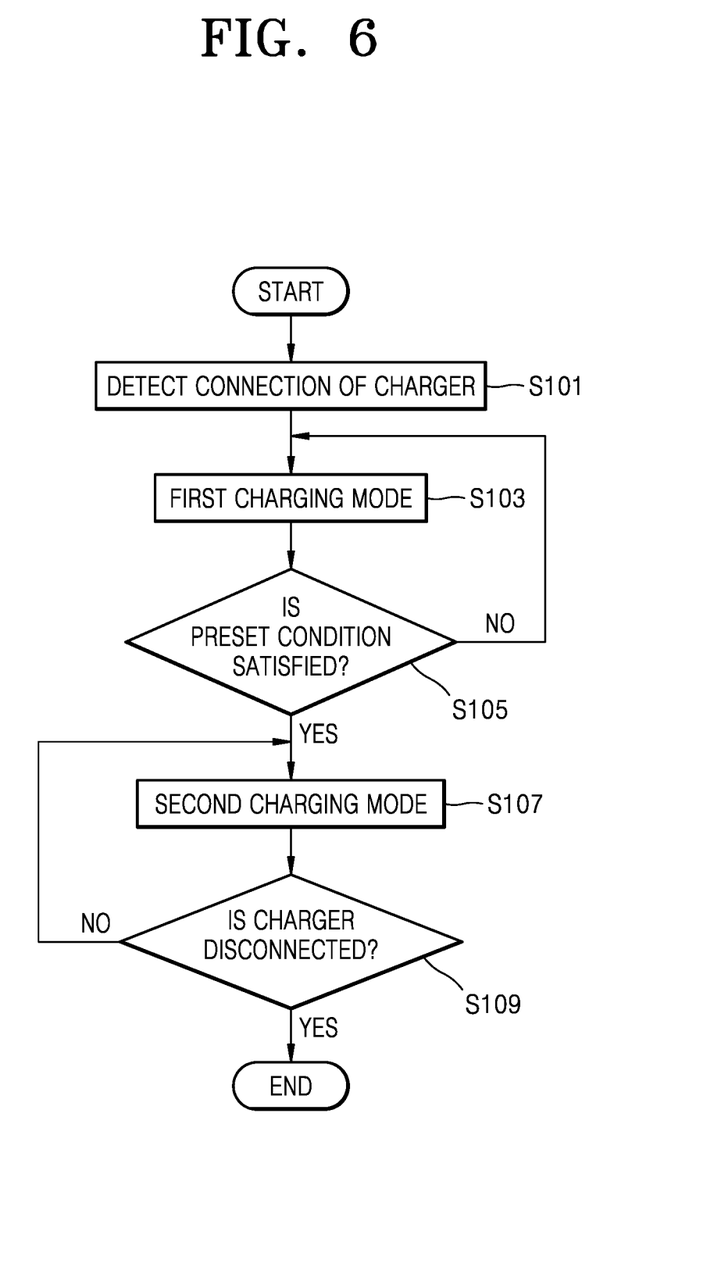
FIG. 6 is a flowchart illustrating a method of controlling charging of a battery pack according to an embodiment of the present disclosure.
Figure 7:
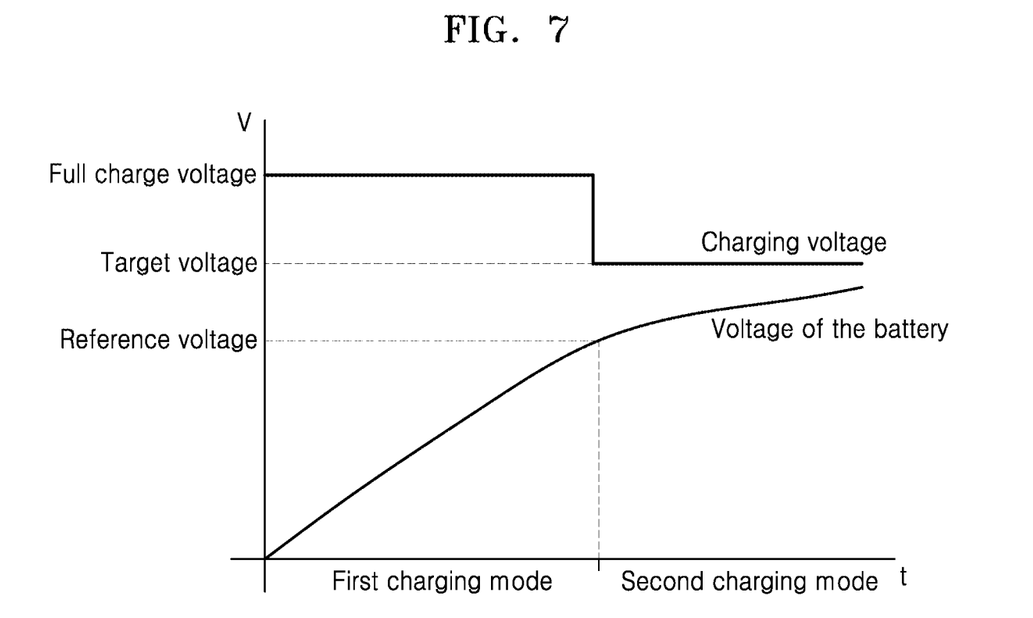
FIG. 7 is a graph illustrating the voltage of the battery when charged in the first mode and the second mode according to an embodiment of the present disclosure.

FIG. 6 is a flowchart illustrating a method of controlling charging of the battery pack 100 according to an embodiment of the present disclosure. FIG. 7 is a graph illustrating the voltage of the battery when charged in the first mode and the second mode according to an embodiment of the present disclosure. The voltages illustrated in FIG. 7 provide an example embodiment of the voltage of the battery when the method of FIG. 6 is performed.

Referring to FIG. 6, the flowchart shows sequential operations performed by the battery pack 100 illustrated in FIG. 1. Therefore, the above descriptions of the components shown in FIG. 1 may be applied to the method described below with reference to the flowchart of FIG. 6 even though the descriptions are not repeated in the following description.

Referring to FIG. 6, the battery pack 100 may detect whether the charger 10 is connected for charging the battery 110. The battery pack 100 starts a charging operation when the charger 10 is connected (S101).

When the charger 10 is connected to the battery pack 100, the battery 110 is charged as charging current flows through the first switch 131 toward the battery 110 or the second pack terminal 153 (S103).

The battery pack 100 may sense whether or not a preset condition is satisfied. As described with reference to FIG. 5, the preset condition is set by considering the state of charge or voltage of the battery 110 or variations in the charging current output from the charger 10 during switching from a constant-current charging mode to a constant-voltage charging mode. In addition, whether or not the preset condition is satisfied may be determined based on a preset voltage or current indicating that the voltage of the battery 110 will soon reach a target voltage (S105).

When the preset condition is satisfied, the battery pack 100 turns off the first switch 131 to cause charging current to flow through the first diode 133. That is, the battery pack 100 turns off the first switch 131 to change the charging mode of the battery 110 to the second charging mode in which the battery 110 is charged with charging current flowing through the first diode 133. A full-charge voltage applied by the charger 10 is not directly applied to the battery 110, but is dropped at the first diode 133 and then applied to the battery 110. In this case, the battery 110 enters a fully charged state in which the battery 110 is only charged up to the voltage dropped at the first diode 133 (S107).

In the second charging mode, the battery pack 100 senses whether the charger 10 is electrically disconnected (S109).

The battery pack 100 turns on the first switch 131 when electrical connection with the charger 10 is not detected. Since the battery pack 100 is not discharged with the first switch 131 being turned off, when it is necessary to discharge the battery 110 after the charger 10 is disconnected, the battery pack 100 may turn on the first switch 131 for preparing a discharging operation (S111).

In this manner, since the battery pack 100 uses the first diode 133, the battery pack 100 may be charged only up to the target voltage which is lower than the full-charge voltage without replacing the charger 10 of the related technology, and deterioration of the battery 110 may be minimized.

In addition, since the battery pack 100 switches the charging mode of the battery 110 from the first charging mode to the second charging mode at an appropriate time based on the state of charge and voltage of the battery 110, a decrease in the charging speed of the battery 110 may be minimized, and heating in the first diode 133 may be minimized.

The scope of the present disclosure is not limited to the embodiments but should be defined by the appended claims and all ranges equivalent to or equivalently modified from the claims.

What is claimed is:

1. A battery pack, comprising:
   a first pack terminal and a second pack terminal configured to be connected to a charger;
   a battery comprising at least one battery cell, a first battery terminal, and a second battery terminal, wherein the at least one battery cell is configured to be fully charged when charged to a full-charge voltage set by the charger;
   a discharging switch comprising a first switch and a diode, the first switch being connected between the second pack terminal and the second battery terminal, the diode being connected in parallel to the first switch and having a forward direction in which charging current of the battery flows; and
   a battery management unit configured to select a charging mode from a first charging mode in which the battery is charged with the full-charge voltage while a first charging current flows through the first switch and a second charging mode in which the battery is charged with a target voltage while a second charging current flows through the diode, wherein the target voltage is less than the full-charge voltage by a preset voltage, and
   wherein the battery management unit is further configured to begin charging the battery with the full-charge voltage in the first charging mode and continue charging the battery in the first charging mode until a voltage of the battery reaches a reference voltage less than the full-charge voltage and the target voltage, and in response to the voltage of the battery reaching the reference voltage and prior to completing charging the battery in the first charging mode, switch the charging mode from the first charging mode to the second charging mode and complete charging the battery in the second charging mode when the voltage of the battery reaches the target voltage, and
   wherein the voltage of the battery continues to increase from the reference voltage to the target voltage in the second charging mode.

2. The battery pack of claim 1, wherein:
   the battery management unit is further configured to turn on the first switch when connection of the charger is not detected between the first pack terminal and the second pack terminal in the second charging mode.

3. The battery pack of claim 1, wherein:
   the second battery terminal comprises a negative terminal of the battery, and the first switch comprises an N-type FET switch.

4. The battery pack of claim 1, wherein the preset voltage is configured to reduce a decrease in a lifespan of the at least one battery cell when the first pack terminal and the second pack terminal are connected to the charger for longer than a preset period of time.

5. The battery pack of claim 4, wherein the preset period of time is 4 hours.

6. A method of controlling charging of a battery, the method comprising:
   detecting connection of a charger configured to charge the battery, wherein the battery is fully charged when charged to a full-charge voltage set by the charger;
   charging the battery with the full-charge voltage while a first charging current flows through a first switch arranged along a high current path through which a discharging current and a charging current of the battery flow and continue charging the battery in the first charging mode until a voltage of the battery reaches a reference voltage less than the full-charge voltage and the target voltage;
   turning off the first switch when the battery reaches the reference voltage; and
   in response to the voltage of the battery reaching the reference voltage and prior to completing charging the battery in the first charging mode, charging the battery with a target voltage while a second charging current flows through a diode connected in parallel to the first switch after charging the battery with the first charging current and complete charging the battery in the second charging mode when the voltage of the battery reaches the target voltage,
   wherein the target voltage is less than the full-charge voltage by a preset voltage, and wherein the voltage of the battery continues to increase from the reference voltage to the target voltage in the second charging mode.

7. The method of claim 6, further comprising:
turning on the first switch when electrical connection with the charger is not detected.

8. A battery pack, comprising:
a first terminal and a second terminal configured to be connected to an external charger;
a battery comprising at least one battery cell, wherein the at least one battery cell is configured to be fully charged when charged to a full-charge voltage set by the external charger;
a first switch and a diode connected in parallel, the first switch and the diode being electrically connected between the battery and the second terminal; and
a battery management unit configured to adjust a state of the first switch to select a charging mode from a first charging mode in which the battery is charged with the full-charge voltage while a charging current flows through the first switch and a second charging mode in which the battery is charged with a target voltage while the charging current flows through the diode, wherein the target voltage is less than the full-charge voltage by a preset voltage,
wherein the battery management unit is further configured to begin charging the battery with the full-charge voltage in the first charging mode and continue charging the battery in the first charging mode until a voltage of the battery reaches a reference voltage less than the full-charge voltage and the target voltage, and in response to the voltage of the battery reaching the reference voltage and prior to completing charging the battery in the first charging mode, switch the charging mode from the first charging mode to the second charging mode and charge the battery according to the second charging mode and complete charging the battery in the second charging mode when the voltage of the battery reaches the target voltage, and
wherein the voltage of the battery continues to increase from the reference voltage to the target voltage in the second charging mode.

9. The battery pack of claim 8, further comprising:
a second switch and a second diode connected in parallel,
wherein the second switch and the second diode are electrically connected between the first switch and the second terminal.

10. The battery pack of claim 9, wherein:
a forward direction of the first diode is opposite to a forward direction of the second diode.

* * * * *